US012658540B2

(12) United States Patent
Nakashima

(10) Patent No.: US 12,658,540 B2
(45) Date of Patent: Jun. 16, 2026

(54) NOTCHED TERMINAL FOR INTERNAL PRESSURE RELEASE

(71) Applicant: Prime Planet Energy & Solutions, Inc., Tokyo (JP)

(72) Inventor: Satoshi Nakashima, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 704 days.

(21) Appl. No.: 17/696,889

(22) Filed: Mar. 17, 2022

(65) Prior Publication Data

US 2022/0302560 A1 Sep. 22, 2022

(30) Foreign Application Priority Data

Mar. 19, 2021 (JP) ................................. 2021-046429

(51) Int. Cl.
| | |
|---|---|
| *H01M 50/557* | (2021.01) |
| *H01M 50/178* | (2021.01) |
| *H01M 50/548* | (2021.01) |
| *H01M 50/566* | (2021.01) |

(52) U.S. Cl.
CPC ....... *H01M 50/557* (2021.01); *H01M 50/178* (2021.01); *H01M 50/548* (2021.01); *H01M 50/566* (2021.01)

(58) Field of Classification Search
None
See application file for complete search history.

(56) References Cited

U.S. PATENT DOCUMENTS

| | | | | |
|---|---|---|---|---|
| 2003/0194608 A1* | 10/2003 | Hirai | ................... | H01M 50/557 |
| | | | | 429/178 |
| 2004/0043289 A1 | 3/2004 | Shimamura et al. | | |
| 2008/0241676 A1 | 10/2008 | Naoi et al. | | |
| 2016/0315301 A1* | 10/2016 | Kim | .................. | H01M 50/3425 |

(Continued)

FOREIGN PATENT DOCUMENTS

| | | |
|---|---|---|
| CN | 101276897 A | 10/2008 |
| CN | 106067525 A | 11/2016 |

(Continued)

OTHER PUBLICATIONS

English translation of JP-2001-148234-A (Year: 2001).*

(Continued)

*Primary Examiner* — Kaj K Olsen
(74) *Attorney, Agent, or Firm* — HAUPTMAN HAM, LLP

(57) ABSTRACT
The terminal disclosed herein is suitably used in a laminated battery, in which an electrode body is accommodated inside a bag-shaped outer casing made of a laminated film. The terminal has an inner terminal portion which is connected to the electrode body inside the outer casing, an outer terminal portion which is exposed to outside of the outer casing, and a plate-shaped portion which is disposed between the inner terminal portion and the outer terminal portion and is welded to the laminated film. In a predetermined part of a surface of the plate-shaped portion, to which the laminated film is welded, a surface-roughened portion having an arithmetic average height higher than an arithmetic average height of a part other than the predetermined part is provided, and a notch portion is provided in the surface-roughened portion.

14 Claims, 5 Drawing Sheets

(56)                     References Cited

U.S. PATENT DOCUMENTS

| | | |
|---|---|---|
| 2017/0054130 A1 | 2/2017 | Roh et al. |
| 2022/0302563 A1 | 9/2022 | Nakashima et al. |

FOREIGN PATENT DOCUMENTS

| | | | | |
|---|---|---|---|---|
| JP | 200193483 A | 4/2001 | | |
| JP | 2001148234 A | * 5/2001 | ............. | Y02P 70/50 |
| JP | 2004362935 A | 12/2004 | | |
| JP | 2005294270 A | 10/2005 | | |
| JP | 2006-164752 A | 6/2006 | | |
| JP | 2008251464 A | 10/2008 | | |
| JP | 200999527 A | 5/2009 | | |
| JP | 2011-129446 A | 6/2011 | | |
| JP | 2011-198742 A | 10/2011 | | |
| JP | 2011243531 A | * 12/2011 | ............. | Y02E 60/10 |
| JP | 2014179193 A | 9/2014 | | |
| JP | 2015100959 A | 6/2015 | | |
| JP | 20164731 A | 1/2016 | | |
| JP | 201797984 A | 6/2017 | | |
| JP | 2019181711 A | 10/2019 | | |
| KR | 10-2018-0113693 A | 10/2018 | | |

OTHER PUBLICATIONS

English translation of JP-2011-243531-A (Year: 2011).*

Office Action (Refusal assessment) in CN Application No. 202210252515.5, dated Jul. 19, 2024, 14pp.

Zhou et al., Introduction to Photovoltaic Power Generation Technology and Applications, Aug. 31, 2011, Central Broadcasting Television University Press, 131-135pages, 8pp.

Office Action in U.S. Appl. No. 17/697,924, dated Jun. 12, 2024, 14pp.

Office Action in U.S. Appl. No. 17/697,924, dated Dec. 4, 2023, 14pp.

Office Action in U.S. Appl. No. 17/697,924, dated Aug. 1, 2023, 13pp.

Office Action in U.S. Appl. No. 17/697,924, dated Nov. 29, 2024, 15pp.

Notice of Allowance in U.S. Appl. No. 17/697,924, dated Jul. 17, 2025, 11pp.

* cited by examiner

NOTCHED TERMINAL FOR INTERNAL PRESSURE RELEASE

CROSS REFERENCE TO RELATED APPLICATIONS

The present application claims priority based on Japanese Patent Application No. 2021-046429 filed on Mar. 19, 2021, the entire contents of which are incorporated herein by reference in its entirety.

BACKGROUND

1. Technical Field

The present invention relates to a terminal. Specifically, the present invention relates to a terminal used in a laminated battery.

2. Description of the Background

Japanese Patent Application Publication No. 2001-93483 discloses an invention relating to a thin battery bag for accommodating a thin battery power generation element. In the bag disclosed in Japanese Patent Application Publication No. 2001-93483, in a peripheral edge thereof, a heat seal portion is formed. The heat seal portion is characterized in that part of the heat seal portion is formed into a notched shape from an inner edge toward an outer edge such that the seal width thereof is narrower than the seal width of other heat seal portions. With this, in the case where the internal pressure of an outer casing abnormally rises, the internal pressure is concentrated on a portion formed into the notched shape. Subsequently, it is assumed that the seal portion in the portion is peeled, a vaporized substance in the outer casing is released to the outside, and the sealability of the entire outer casing is reduced relatively slowly.

SUMMARY

In a laminated battery, when pressure inside an outer casing (internal pressure) rises to a predetermined value or higher, it is desirable that the outer casing is torn and the internal pressure is thereby released more stably. On the other hand, when the pressure inside the outer casing (internal pressure) is permissible internal pressure, it is desirable that the outer casing is not torn. In a mode in which the notch-shaped portion is formed only by adjusting the seal width of the heat seal portion, variation of the internal pressure which causes peeling of the heat seal portion from the notch-shaped portion can be increased unless the notched shape of the heat seal portion is formed with high accuracy. Accordingly, when accuracy in the formation of the heat seal portion is low, a phenomenon, in which the heat seal portion is peeled at the permissible internal pressure, or the heat seal portion is not peeled even when the permissible internal pressure is exceeded, easily occurs.

A terminal disclosed herein is a terminal used in a laminated battery, in which an electrode body is accommodated inside a bag-shaped outer casing made of a laminated film, and the terminal includes: an inner terminal portion which is connected to the electrode body inside the outer casing; an outer terminal portion which is exposed to outside of the outer casing; and a plate-shaped portion which is disposed between the inner terminal portion and the outer terminal portion and is welded to the laminated film. In a predetermined part of a surface of the plate-shaped portion, to which the laminated film is welded, a surface-roughened portion having an arithmetic average height higher than an arithmetic average height of a part other than the predetermined part is provided, and a notch portion is provided in the surface-roughened portion.

In the terminal, the surface-roughened portion having the notch portion is provided in the portion to which the laminated film is welded. It is possible to adjust the width of the surface-roughened portion and the shape of the notch portion easily with high accuracy. Accordingly, adjustment of a predetermined value of internal pressure of the outer casing at which peeling occurs in a weld portion of the laminated film is facilitated, and variation of the predetermined value is reduced. As a result, when the pressure inside the outer casing (internal pressure) rises to the predetermined value, it is possible to stably tear the outer casing from the notch portion, and release the internal pressure.

In a preferred aspect of the terminal disclosed herein, the notch portion is provided such that a width of the surface-roughened portion is partially reduced from a side on which the inner terminal portion is provided toward a side on which the outer terminal portion is provided. By adjusting the partially reduced width of the surface-roughened portion, it is possible to adjust the predetermined value of the internal pressure at which the outer casing is torn.

In a preferred aspect of the terminal disclosed herein, the arithmetic average height of the surface-roughened portion is not less than 0.1 μm and not more than 30 μm. When the arithmetic average height thereof falls within the range, a surface area of a surface to which the laminated film is welded is increased properly, and hence, even when the notch portion is provided, it is possible to maintain the bonding strength of the laminated film at a high level.

In a preferred aspect of the terminal disclosed herein, the surface-roughened portion is provided so as to have a belt-like shape from one end of the surface of the plate-shaped portion to another end of the surface of the plate-shaped portion. In addition, in a preferred aspect thereof, the surface-roughened portion is provided on each of both surfaces and an end surface of the plate-shaped portion. With this, it is possible to weld the laminated film and the terminal together more firmly, and improve the sealability of the outer casing. As a result, it is possible to prevent the outer casing from being torn from a portion other than the notch portion unexpectedly.

In a preferred aspect of the terminal disclosed herein, the terminal is constituted of a clad material, in which the inner terminal portion is made of a first metal and the outer terminal portion is made of a second metal different from the first metal. With this, it is possible to improve bondability to members connected to the inner terminal portion and the outer terminal portion.

In a preferred aspect of the terminal disclosed herein, the surface-roughened portion is provided so as to straddle a boundary between the first metal and the second metal. With this, it is possible to firmly weld the laminated film such that the boundary between the first metal and the second metal is covered with the laminated film, and hence it is possible to prevent an electrolyte (e.g., an electrolyte solution) and water in the air from entering the boundary.

In a preferred aspect of the terminal disclosed herein, one of the first metal and the second metal is made of copper or an alloy mainly composed of copper, and a coat layer is provided on a surface of a portion made of the copper or the alloy mainly composed of copper. With this, it is possible to prevent contact between the copper or the alloy mainly composed of copper and resin (e.g., an inner surface of the laminated film) and suppress oxidation degradation of the resin.

In a preferred aspect of the terminal disclosed herein, the terminal further includes a resin layer which is provided so as to cover at least part of the surface-roughened portion. With this, it is possible to improve bonding strength between the terminal and the laminated film.

DETAILED DESCRIPTION

Figure 1:
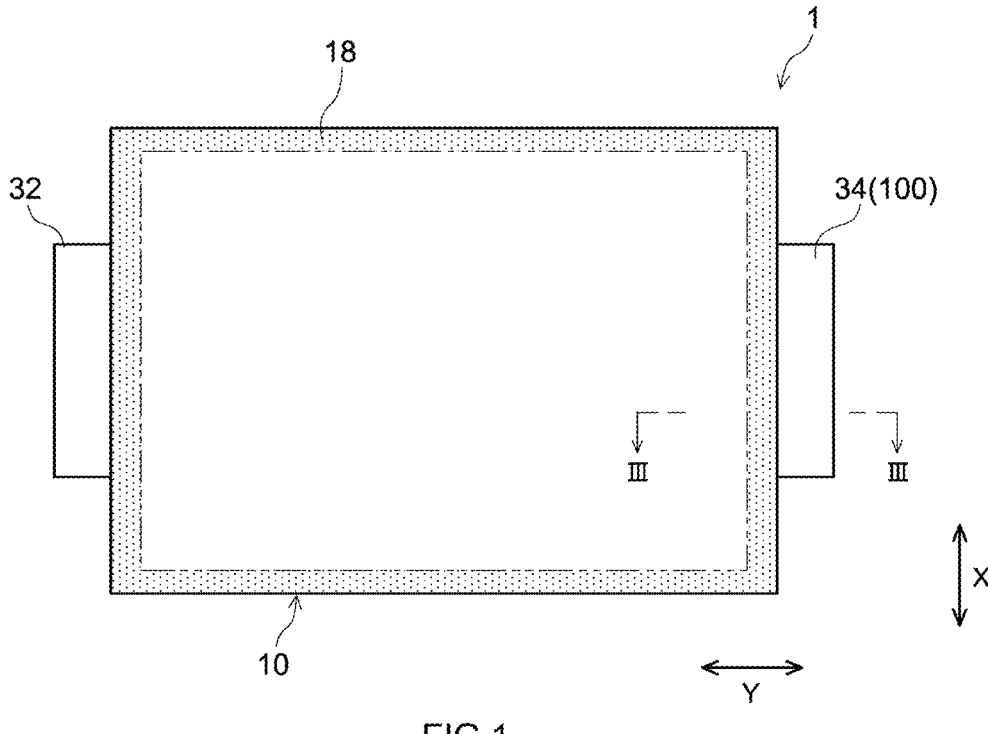
FIG. 1 is a plan view schematically showing the configuration of a laminated battery.

Hereinbelow, a preferred embodiment of a technique disclosed herein will be described with reference to the drawings appropriately. Note that, apart from matters which are specifically mentioned in the present specification, other matters which are necessary for implementation can be understood as design matters of those skilled in the art based on the conventional art in the field. The technique disclosed herein can be implemented based on contents disclosed in the present specification and common general technical knowledge in the field. In addition, in the following drawings, members and portions which have the same functions are designated by the same reference numerals, and the duplicate description thereof is omitted or simplified in some cases.

Note that, in the present specification, a "laminated battery" denotes batteries each having a configuration in which an electrode body is accommodated inside a laminated film (sheet)-shaped outer casing member (outer casing). In addition, in the present specification, a "battery" is a term denoting storage devices from which electrical energy can be extracted, and is a concept including a primary battery and a secondary battery. Further, in the present specification, a "secondary battery" is a term denoting storage devices which can be charged and discharged repeatedly, and is a concept including what is called a storage battery (chemical cell) such as a lithium ion secondary battery or a nickel-metal hydride battery, and a capacitor (physical cell) such as an electric double layer capacitor.

Hereinbelow, a description will be given of the configuration of a laminated lithium ion secondary battery (hereinafter also referred to as a "laminated battery 1" simply) in which a terminal disclosed herein can be suitably used. Note that, in order to describe an example of a preferred method of using the terminal disclosed herein, the laminated battery 1 which includes the terminal disclosed herein as a negative electrode terminal 34 is shown in the drawing. In the following description, it is assumed that reference signs X, Y, and Z in the drawings indicate a short side direction of the laminated battery 1, a long side direction thereof orthogonal to the short side direction, and a thickness direction thereof, respectively. Note that the directions are merely directions for the sake of convenience of explanation, and are not intended to limit a placement mode of the laminated battery 1.

Figure 2:
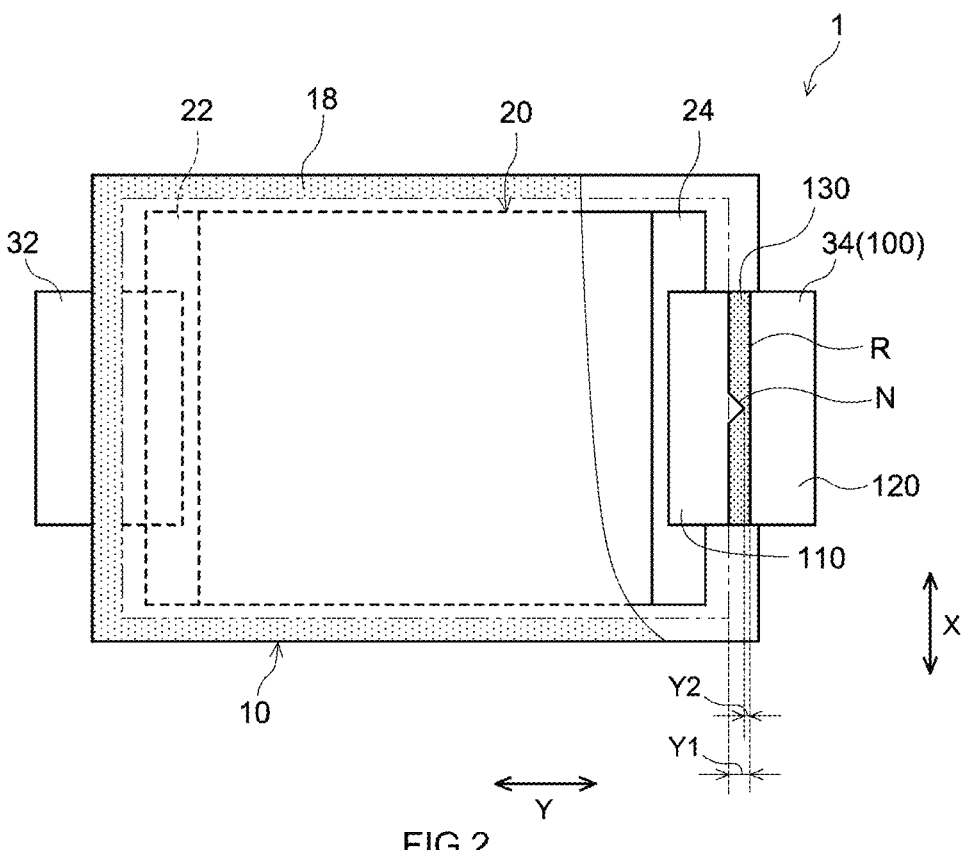
FIG. 2 is a partially cutaway plan view of the laminated battery in FIG. 1.
Figure 3:
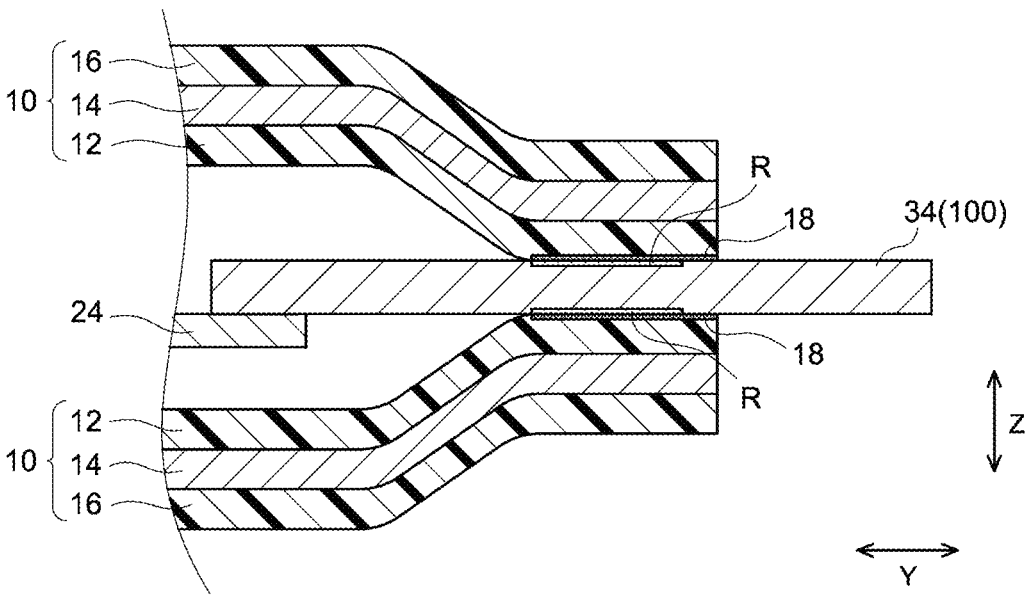
FIG. 3 is a cross-sectional view taken along the line of FIG. 1.

FIG. 1 is a plan view schematically showing the laminated battery 1. FIG. 2 is a partially cutaway plan view of the laminated battery 1 in FIG. 1. FIG. 3 is a cross-sectional view taken along the line of FIG. 1. As shown in FIG. 1 and FIG. 2, the laminated battery 1 includes an outer casing 10, an electrode body 20, electrode terminals (a positive electrode terminal 32 and a negative electrode terminal 34), and an electrolyte (not shown).

The outer casing 10 is typically constituted by a bag-shaped laminated film, and accommodates the electrode body 20 and the electrolyte inside the outer casing 10. In addition, a weld portion 18 in which inner surfaces (i.e., surfaces facing the electrode body 20) of a laminated film are stacked and welded together is formed in a peripheral edge of space of the outer casing 10 which accommodates the electrode body 20 and the electrolyte. With this, the electrode body 20 and the electrolyte are sealed inside the outer casing 10. In the present embodiment, the outer casing 10 is formed by stacking wide surfaces of two rectangular laminated films and heat-welding both end portions in the short side direction X of the laminated battery 1 and both end portions in the long side direction Y of the laminated battery 1 together so as to form a belt-like shape. Note that, in order to form the outer casing 10, one rectangular laminated film which is doubled or a cylindrical laminated film may also be used. In such a case, it is only necessary to form the weld portion 18 only in a portion required to seal the outer casing 10, and the weld portion 18 does not need to be formed in the entire peripheral edge portion of the space which accommodates the electrode body 20 and the electrolyte. In addition, the outer casing 10 may also be formed by laminating three or more laminated films.

The outer casing 10 has insulation properties and resistance to the electrolyte to be used. In order to allow heat welding, the outer casing 10 has a sealant layer made of resin at least as an inner surface (a surface facing the electrode body 20). In the present embodiment, as shown in FIG. 3, the outer casing 10 has a three-layer structure in which a sealant layer 12, a metal layer 14, and a protective layer 16 are stacked in this order from an inner side. Note that the structure of the outer casing 10 is not limited to the above three-layer structure, and the outer casing 10 may have, e.g., a single layer structure having only the sealant layer and may also have a multilayer structure having two layers or four or more layers.

Examples of the resin constituting the sealant layer 12 include thermoplastic resins such as a polyolefin resin, a polyester resin, a polystyrene resin, and a polyvinyl chloride resin. Examples of the polyolefin resin include polyethylene (PE), polypropylene (PP), and acid-modified polyolefin resins such as maleic anhydride-modified polypropylene and maleic anhydride polyester. An example of the polyester resin includes polyethylene terephthalate (PET) or the like. In addition, in order to prevent oxidation caused by contact with a metal member (e.g., an electrode terminal), the sealant layer 12 can contain a metal inactivating agent.

The metal layer 14 is a layer for improving gas barrier properties and moisture barrier properties of the outer casing 10. The metal layer 14 can be made of metal materials such as, e.g., aluminum, iron, and stainless steel. From the viewpoint of reducing cost and weight, among the metal materials, the metal layer 14 is preferably made of aluminum.

The protective layer 16 is a layer for improving durability and shock resistance of the outer casing 10. The protective layer 16 is made of, e.g., a biaxially oriented polyester-based resin or a biaxially oriented polyamide-based resin. An example of the biaxially oriented polyester-based resin includes biaxially oriented polyethylene terephthalate or the like. An example of the biaxially oriented polyamide-based resin includes nylon or the like. Note that the protective layer 16 typically constitutes an outer surface of the outer casing 10, but another layer may be further provided outside the protective layer 16 and, e.g., a printed layer or a flame-retardant layer may be provided.

The configuration of the electrode body 20 may be similar to that of a conventionally known battery, and is not particularly limited. The electrode body 20 includes a sheet-shaped positive electrode (positive electrode sheet) and a sheet-shaped negative electrode (negative electrode sheet). Herein, the electrode body 20 is a laminated electrode body in which a square (typically, rectangular) positive electrode sheet and a square (typically, rectangular) negative electrode sheet are stacked in a state in which the square positive electrode sheet and the square negative electrode sheet are insulated from each other. Note that the electrode body 20 may also be, e.g., a wound electrode body in which a belt-shaped positive electrode sheet and a belt-shaped negative electrode sheet are stacked and wound in a longitudinal direction in a state in which the belt-shaped positive electrode sheet and the belt-shaped negative electrode sheet are insulated from each other.

The positive electrode sheet has positive electrode current collector foil and a positive electrode active material layer (not shown) which contains a positive electrode active material. The positive electrode active material layer is formed on one surface or both surfaces of the positive electrode current collector foil. In addition, at an end portion of the positive electrode current collector foil (herein, an end portion on the left in the long side direction Y in FIG. 2), a positive electrode current collector foil exposed portion 22 in which the positive electrode active material layer is not formed is provided. The positive electrode current collector foil is made of a metal material such as, e.g., aluminum, nickel, titanium, or stainless steel. The positive electrode active material may be similar to that of the conventionally known battery, and it is possible to use a lithium transition metal composite oxide such as, e.g., a lithium-nickel-cobalt-manganese composite oxide.

The negative electrode sheet has negative electrode current collector foil and a negative electrode active material layer (not shown) which contains a negative electrode active material. The negative electrode active material layer is formed on one surface or both surfaces of the negative electrode current collector foil. In addition, at an end portion of the negative electrode current collector foil (herein, an end portion on the right in the long side direction Y in FIG. 2), a negative electrode current collector foil exposed portion 24 in which the negative electrode active material layer is not formed is provided. The negative electrode current collector foil is made of a metal material such as, e.g., copper, nickel, titanium, or stainless steel. The negative electrode active material may be similar to that of the conventionally known battery, and it is possible to use a carbon material such as, e.g., graphite.

The electrolyte may be similar to that of the conventionally known battery, and is not particularly limited. As the electrolyte, it is possible to use, e.g., a nonaqueous electrolyte solution containing a nonaqueous solvent and a supporting electrolyte. As the nonaqueous solvent, it is possible to use aprotic solvents such as, e.g., carbonates, ethers, esters, sulfones, and lactones. As the supporting electrolyte, it is possible to use lithium salt such as, e.g., $LiPF_6$. The concentration of the supporting electrolyte is not particularly limited, and the concentration thereof can be, e.g., 0.1 mol/L to 1.2 mol/L. Note that the electrolyte is not limited to a liquid electrolyte, and the electrolyte may be a gel-like electrolyte or may also be a solid electrolyte.

The electrode terminals (the positive electrode terminal 32 and the negative electrode terminal 34) pass between the laminated films stacked on each other in the weld portion 18 and are inserted into the outer casing 10. One end of the positive electrode terminal 32 is electrically connected to the positive electrode current collector foil exposed portion 22 inside the outer casing 10, and the other end of the positive electrode terminal 32 is exposed to the outside of the outer casing 10. The positive electrode terminal 32 is, e.g., a plate-shaped metal member having a rectangular wide surface. The positive electrode terminal 32 may be similar to that used in a conventionally known laminated battery, and is made of, e.g., aluminum or an alloy mainly composed of aluminum. One end of the negative electrode terminal 34 is electrically connected to the negative electrode current collector foil exposed portion 24 inside the outer casing 10, and the other end of the negative electrode terminal 34 is exposed to the outside of the outer casing 10. The negative electrode terminal 34 is, e.g., a plate-shaped metal member having a rectangular wide surface. The negative electrode terminal 34 may be similar to that used in the conventionally known laminated battery, and is made of, e.g., copper or an alloy mainly composed of copper. Note that, in the present specification, an "alloy mainly composed of a metal M" denotes an alloy having the metal M as an ingredient having the highest content (the metal M is any metal). Hereinbelow, a description will be given of the configuration of a terminal 100 constituting the negative electrode terminal 34. Note that the terminal 100 can also be used as the positive electrode terminal 32.

Figure 4:
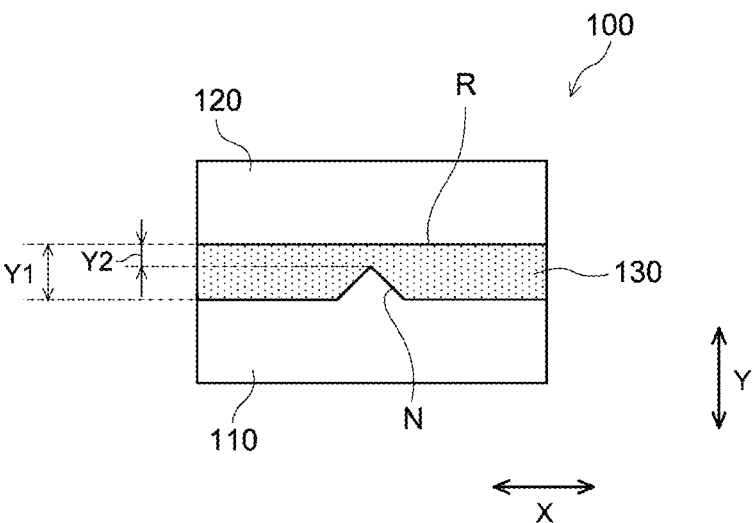
FIG. 4 is a plan view schematically showing the configuration of a terminal according to an embodiment.

FIG. 4 is a plan view schematically showing the configuration of the terminal 100. The terminal 100 has an inner terminal portion 110 at one end, an outer terminal portion 120 at the other end, and a plate-shaped portion 130 between the inner terminal portion 110 and the outer terminal portion 120. Further, a surface-roughened portion R having a notch portion N is provided on the surface of the plate-shaped portion 130. In the present embodiment, the terminal 100 is plate-shaped and has a rectangular wide surface, and the shape of the wide surface is not particularly limited. In addition, as long as the terminal 100 has the plate-shaped portion 130, the inner terminal portion 110 and the outer terminal portion 120 do not need to be plate-shaped.

The inner terminal portion 110 is a portion which is connected to the electrode body 20 inside the outer casing 10. For example, as shown in FIG. 2, the inner terminal portion 110 is directly connected to the negative electrode current collector foil exposed portion 24 inside the outer casing 10. In addition, the inner terminal portion 110 may be indirectly connected to the electrode body 20 and may be connected to the electrode body 20 via, e.g., a conductive member.

The outer terminal portion 120 is a portion which is exposed to the outside of the outer casing 10. For example, as shown in FIG. 2, the terminal 100 is disposed so as to be inserted into the outer casing 10, and the outer terminal portion 120 is thereby disposed outside the outer casing 10. The outer terminal portion 120 is a portion which can be connected to other members, and can be connected to a conductive metal member such as, e.g., a bus bar.

The plate-shaped portion 130 has the surface-roughened portion R on the surface. The surface-roughened portion R is provided in a predetermined part to which the laminated film is welded. Protrusions and depressions are formed in the surface-roughened portion R. Consequently, the surface-roughened portion R has an arithmetic average height Sa which is higher than those of the other parts of the terminal 100. With this, the surface area of the surface-roughened portion R is increased, and hence the laminated film is welded more firmly.

Protrusions and depressions are formed in the surface-roughened portion R. The arithmetic average height Sa of the surface-roughened portion R is not particularly limited, and is preferably not less than 0.1 μm and not more than 30 μm. When the arithmetic average height Sa falls within the above range, the surface area of the surface to which the laminated film is welded is suitably increased without spoiling the strength and conductivity of the terminal 100. Consequently, even when the notch portion N described later is provided in the surface-roughened portion R, it is possible to maintain the bonding strength of the laminated film at a high level. Note that it is possible to measure the arithmetic average height Sa by observation with a laser microscope. As the laser microscope, it is possible to use, e.g., VK-X1000 manufactured by KEYENCE CORPORATION.

In the vicinity of the tip of a protrusion portion of protrusions and depressions of the surface-roughened portion R, a minute metal particle can exist. With this, the surface area of the surface-roughened portion R is further increased, and hence firmer weld to the laminated film is implemented. The above metal particle is a particle generated by surface roughening by laser irradiation or the like. In this case, the metal particle is made of the same metal material as that of the portion in which the surface-roughened portion R is provided. The metal particle can have an average diameter of, e.g., 50 nm to 1000 nm. It is possible to observe the metal particle with a scanning electron microscope (SEM).

As shown in FIG. 4, in the present embodiment, the surface-roughened portion R is provided from one end of the surface of the plate-shaped portion 130 to the other end thereof so as to form a belt-like shape. In addition, in the present embodiment, the surface-roughened portion R is provided on both surfaces of the plate-shaped portion 130. Further, the surface-roughened portion R is preferably provided on an end surface of the plate-shaped portion 130. With this, it is possible to weld the laminated film and the terminal 100 together more firmly, and improve the sealability of the outer casing 10. Accordingly, it is possible to prevent the outer casing 10 from being torn from a portion other than the notch portion N unexpectedly. Note that the surface-roughened portion R may also be provided only on one surface of the plate-shaped portion 130.

The notch portion N is provided in the surface-roughened portion R. As shown in FIG. 4, in the present embodiment, the notch portion N of which the width is partially reduced from a side on which the inner terminal portion 110 is provided toward a side on which the outer terminal portion 120 is provided (the direction Y in FIG. 4) is provided in the surface-roughened portion R. In a portion in which the notch portion N is provided, a width Y2 which is the narrowest width in a width Y1 of the surface-roughened portion R is present. In the notch portion N, the width of the portion subjected to surface roughening is narrower than those of the other portions, and hence the width of the portion to which the laminated film is welded firmly is reduced. With this, when the pressure inside the outer casing 10 (internal pressure) rises to a predetermined value, the outer casing 10 is torn stably from the notch portion N, and the internal pressure is released. In addition, by adjusting the narrowest width Y2, it is possible to adjust the predetermined value of the internal pressure of the outer casing 10 at which the outer casing 10 is torn. Although not particularly limited, the narrowest width Y2 can be a width of, e.g., ¼ to ¾ of the width Y1 of the surface-roughened portion R.

It is possible to provide the surface-roughened portion R by conventionally known methods such as, e.g., laser irradiation, etching, plating treatment (e.g., roughened nickel plating, roughened copper plating, or roughened silver plating), frame treatment, corona treatment, plasma treatment, and surface polishing. According to the technique of surface roughening, it is possible to easily perform adjustment of the narrowest width Y2 of the surface-roughened portion R and adjustment of the shape of the notch portion with high accuracy. With this, variation of the internal pressure of the outer casing 10 which causes peeling of the laminated film welded to the surface-roughened portion R is reduced. As a result, it is possible to stably tear the outer casing 10 at a desired value of the internal pressure of the outer casing 10 from the notch portion N. Note that, as shown in FIG. 4, the shape of the notch portion N is triangular when viewed in, e.g., a plan view. However, the shape of the notch portion N is not particularly limited, and can be trapezoidal, semicircular, rhombic, and polygonal.

The number of notch portions N is not particularly limited, and may be one or may also be two or more. In addition, the notch portion N may be provided only on one surface of the plate-shaped portion 130 and may also be provided on both surfaces thereof.

The terminal 100 is made of metal having conductivity, and the metal may be similar to metal constituting an electrode terminal used in the conventionally known laminated battery. Examples of the metal include aluminum, an alloy mainly composed of aluminum, copper, an alloy mainly composed of copper, and nickel. In the present embodiment, the terminal 100 is made of copper. Note that the metal constituting the terminal 100 may be appropriately changed depending on whether the metal is used in the positive electrode terminal 32 or the negative electrode terminal 34.

In the case where the terminal 100 is made of copper or an alloy mainly composed of copper, a coat layer is preferably provided at least at a position in the plate-shaped portion 130 to which the laminated film is welded. By contact between copper and resin, oxidation degradation of the resin can be facilitated. For example, the sealant layer 12 of the outer casing 10 comes into contact with copper, and oxidation degradation of the resin constituting the sealant layer 12 can be thereby facilitated. Accordingly, by providing the coat layer at the position in the plate-shaped portion 130 to which the laminated film is welded, it is possible to suppress degradation of the resin (e.g., the sealant layer 12). The coat layer can be made of, e.g., nickel, molybdenum, zirconium, titanium, a trivalent chromium compound, a phosphorous compound, triazine thiol, or an aminated phenol polymer.

The terminal 100 can have a resin layer 40 provided so as to cover at least part of the surface-roughened portion R. The resin layer 40 is integrated with the sealant layer 12 of the outer casing 10 by heat welding, and hence it is possible to strengthen the weld between the terminal 100 and the laminated film. Note that the resin layer 40 can be made of a material which can constitute the above sealant layer 12.

Figure 5:
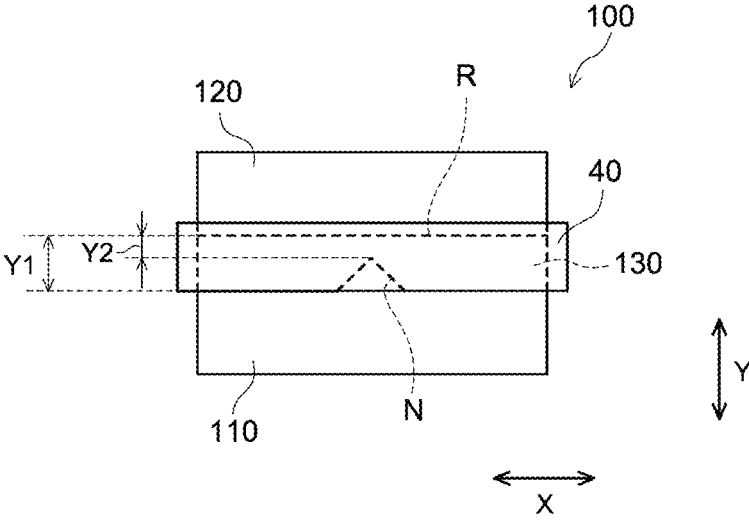
FIG. 5 is a plan view schematically showing the configuration of a terminal including a resin layer according to the embodiment.

FIG. 5 is a plan view schematically showing the configuration of the terminal 100 including the resin layer 40. As shown in FIG. 5, the resin layer 40 is rectangular when viewed in a plan view. In addition, in FIG. 5, the resin layer 40 is formed to be longer than the plate-shaped portion 130 of the terminal 100 in the long side direction of the terminal 100 (the direction X in the drawing). Further, the resin layer 40 has a width wider than the width Y1 of the surface-roughened portion R in the short side direction of the terminal 100 (the direction Y in the drawing). Note that the shape and size of the resin layer 40 are not particularly limited. For example, the resin layer 40 may have a width narrower than the width Y1 of the surface-roughened portion R in the short side direction of the terminal 100 (the direction Y in the drawing).

In FIG. 5, the resin layer 40 is disposed so as to cover the entire surface-roughened portion R, but the disposition of the resin layer 40 is not particularly limited. For example, the resin layer 40 may be disposed so as to cover only part of the surface-roughened portion R. In addition, the resin layer 40 may be provided only on one surface of the terminal 100 and may also be provided on both surfaces of the terminal 100. Although not particularly limited, the thickness of the resin layer 40 can be, e.g., 50 μm to 250 μm.

One embodiment of the technique disclosed herein has been described thus far. Note that the above-described embodiment shows an example of the terminal disclosed herein, and is not intended to limit the technique disclosed herein. Hereinbelow, modifications of the technique disclosed herein will be described.

First Modification

Figure 6:
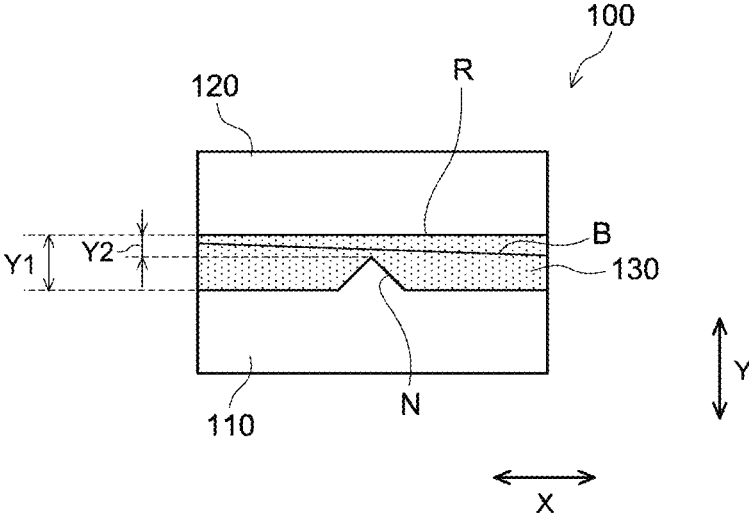
FIG. 6 is a plan view schematically showing the configuration of a first modification.

FIG. 6 is a plan view schematically showing the configuration of a first modification. While the terminal 100 is made of one type of a metal in the above-described embodiment, the terminal 100 may also be a clad material in which different types of metals are bonded to each other. In the first modification, the inner terminal portion 110 is made of a first metal, and the outer terminal portion 120 is made of a second metal different from the first metal. A boundary B between the first metal and the second metal is disposed in the plate-shaped portion 130 in this modification. By using the clad material, it is possible to make the first metal constituting the inner terminal portion 110 identical to a metal constituting a metal member (e.g., the positive electrode current collector foil exposed portion 22, the negative electrode current collector foil exposed portion 24, or the like) connected to the inner terminal portion 110, and it is possible to make the second metal constituting the outer terminal portion 120 identical to a metal constituting a metal member (e.g., the bus bar or the like) connected to the outer terminal portion 120. With this, bondability of each of the inner terminal portion 110 and the outer terminal portion 120 to other members is improved.

As the first metal and the second metal, it is possible to use, e.g., aluminum, an alloy mainly composed of aluminum, copper, an alloy mainly composed of copper, and nickel. In the case where one of the first metal and the second metal is made of copper or the alloy mainly composed of copper, the above-described coat layer is preferably provided on the surface of the portion made of copper or the alloy mainly composed of copper. The material and formation method of the coat layer may be similar to those in the above-described embodiment.

In the boundary B between the first metal and the second metal, in the case where an electrolyte (e.g., an electrolyte solution) enters the boundary B or in the case where water enters the boundary B from the outside air, electrolytic corrosion may occur. Accordingly, the surface-roughened portion R is preferably provided so as to straddle the boundary B between the first metal and the second metal. With this, the laminated film is welded to both of the first metal and the second metal firmly, and hence it is possible to weld the laminated film such that the boundary B between the first metal and the second metal is covered with the laminated film. In addition, the notch portion N is preferably provided on the surface of the first metal. With this, it is possible to prevent the electrolyte (e.g., the electrolyte solution) from entering the boundary B between the first metal and the second metal from the notch portion N.

Second Modification

Figure 7:
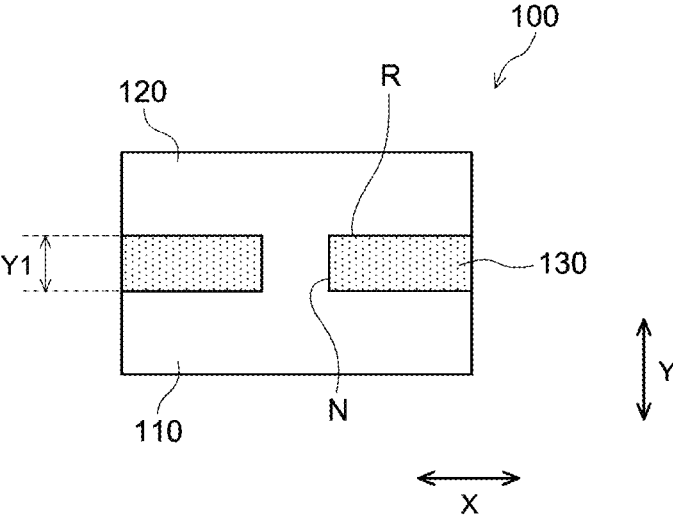
FIG. 7 is a plan view schematically showing the configuration of a second modification.

FIG. 7 is a plan view schematically showing the configuration of a second modification. In the above-described embodiment, the notch portion N is provided by partially reducing the width of the surface-roughened portion R from the side on which the inner terminal portion 110 is provided toward the side on which the outer terminal portion 120 is provided (the long side direction Y in FIG. 4), but the notch portion N is not limited thereto. As shown in FIG. 7, the notch portion N which allows the side on which the inner terminal portion 110 is provided and the side on which the outer terminal portion 120 is provided to communicate with each other in a portion of the surface-roughened portion R which is not subjected to surface roughening may also be provided. With this, when the laminated film is welded to the surface-roughened portion R, the bonding strength of the portion which is not subjected to surface roughening is reduced. As a result, when the internal pressure of the outer casing 10 rises to the predetermined value, the laminated film of the portion which is not subjected to surface roughening is peeled, and the internal pressure can be thereby released. In addition, it is possible to appropriately adjust the predetermined value at which the internal pressure of the outer casing 10 is released with the resin layer 40.

Hereinbelow, a description will be given of a preferred example of a method of manufacturing the terminal disclosed therein. Note that the method of manufacturing the terminal disclosed herein is not limited to the following method.

The method of manufacturing the terminal disclosed herein includes (A) preparing a metal member having a plate-shaped portion at least between one end and the other end (hereinafter also referred to as a "metal member preparation step"), and (B) providing a surface-roughened portion having a notch portion in the plate-shaped portion of the metal member (hereinafter also referred to as a "surface roughening step"). Further, the method of manufacturing the terminal disclosed herein can include (C) forming a coat layer in a predetermined part of the metal member (hereinafter also referred to as a "coat layer formation step"), and/or (D) providing a resin layer provided so as to cover at least part of the surface-roughened portion (hereinafter also referred to as a "resin layer formation step"). Note that the order of (A), (B), (C), and (D) described above can be changed appropriately. For example, the order of (A), (B), (C), and (D) and the order of (A), (C), (B), and (D) may also be adopted.

(A) Metal Member Preparation Step

In the metal member preparation step, the metal member having the plate-shaped portion at least between one end and the other end is prepared. As the metal member, it is possible to use a metal member of which the entire shape is plate-shaped suitably. At this point, a metal member having a size corresponding to one terminal to be manufactured may be prepared, and a long metal member which allows two or more terminals to be manufactured may also be prepared. By using the long metal member, it is possible to manufacture a plurality of the terminals more easily and efficiently.

(B) Surface Roughening Step

The surface-roughened portion having the notch portion is provided at the predetermined position of the plate-shaped portion between one end and the other end of the prepared metal member. Note that the surface roughening method is as described above. Among the methods, it is preferable to perform laser irradiation and plating treatment.

As an example of the laser irradiation, in the case where the metal member is made of aluminum, by using conditions of, e.g., irradiation wavelength: 1060 nm, pulse energy: 0.8 mJ/pulse, and scanning speed: 7500 mm/sec, it is possible to provide the surface-roughened portion properly. As a laser apparatus, it is possible to suitably use, e.g., LP-Z250-BE1 or LP-ADP40 manufactured by Panasonic Corporation. Note that the conditions of the laser irradiation mentioned above are examples, and are not particularly intended to limit the technique disclosed herein. In addition, the conditions of the laser irradiation can be appropriately changed according to the type of the metal member subjected to surface roughening.

In the case where plating treatment is performed, it is preferable to perform masking on a portion which is not subjected to surface roughening before the plating treatment is performed. In addition, after the surface roughening by the plating treatment is performed, protrusions and depressions on a roughened portion may be destroyed by a laser or the like, and a notch portion may be thereby provided. Further, the arithmetic average height of the surface-roughened portion may be adjusted appropriately by a laser or the like.

(C) Coat Layer Formation Step

In the case where the terminal having the above-described coat layer is manufactured, the coat layer formation step is performed before or after the surface roughening step. Preferably, the coat layer formation step is performed before the surface roughening step. With this, it is possible to perform surface roughening from the surface of the coat layer, and hence it is possible to manufacture the terminal disclosed herein properly. A method of forming the coat layer may be appropriately changed according to the material of the coat layer, and examples of the method include plating treatment (nickel plating or the like) and solution treatment (phosphate chromate treatment, triazine thiol treatment, or the like).

(D) Resin Layer Formation Step

In the case where the terminal having the above-described resin layer 40 is manufactured, the resin layer is formed after (A), (B), and (C) described above. A method of forming the resin layer is not particularly limited, and it is possible to form the resin layer by, e.g., welding of a film-shaped resin (sealant film), application of a resin material, and insert molding.

Thus, it is possible to manufacture the terminal disclosed herein. Note that, in the case where the long metal member which allows a plurality of the terminals to be manufactured is used, the metal member may be cut into pieces of desired size appropriately. In addition, on an as needed basis, surface roughening and formation of the coat layer may be performed on a cut surface.

What is claimed is:

1. A terminal used in a laminated battery, in which an electrode body is accommodated inside a bag-shaped outer casing made of a laminated film, the terminal comprising:
   an inner terminal portion which is connected to the electrode body inside the outer casing;
   an outer terminal portion which is exposed to outside of the outer casing; and
   a plate portion which is disposed between the inner terminal portion and the outer terminal portion and is welded to the laminated film, wherein
   the terminal is constituted of a clad material, in which the inner terminal portion is made of a first metal and the outer terminal portion is made of a second metal different from the first metal,
   one of the first metal or the second metal is made of copper or an alloy mainly composed of copper, and a plating coat layer is on a surface of a portion made of the copper or the alloy mainly composed of copper,
   the plating coat layer comprises at least one material selected from the group consisting of molybdenum, zirconium, titanium and a trivalent chromium compound,
   in a predetermined part of a surface of the plate portion, to which the laminated film is welded, a surface-roughened portion having an arithmetic average height higher than an arithmetic average height of a part other than the predetermined part is provided, and
   wherein, on the surface of the plate portion, at the end portion of the surface-roughened portion on the side of the inner terminal portion, a remaining portion that has an arithmetic average height which is lower than the surface-roughened portion and that is constituted such that a width of the surface-roughened portion is partially reduced from an inner terminal portion side toward an outer terminal portion side is provided, and
   the plating coat layer is on a surface of the remaining portion.

2. The terminal according to claim 1, wherein the arithmetic average height of the surface-roughened portion is not less than 0.1 μm and not more than 30 μm.

3. The terminal according to claim 1, wherein the surface-roughened portion is provided so as to extend from one end of the surface of the plate portion to another end of the surface of the plate portion.

4. The terminal according to claim 1, wherein the surface-roughened portion is provided on each of both surfaces and an end surface of the plate portion.

5. The terminal according to claim 1, wherein the surface-roughened portion is provided so as to straddle a boundary between the first metal and the second metal.

6. The terminal according to claim 1, further comprising:
   a resin layer which is provided so as to cover at least part of the surface-roughened portion.

7. The terminal according to claim 1, wherein the plating coat layer comprises nickel.

8. The terminal according to claim 1, wherein the plating coat layer comprises molybdenum.

9. The terminal according to claim 1, wherein the plating coat layer comprises zirconium.

10. The terminal according to claim 1, wherein the plating coat layer comprises titanium.

11. The terminal according to claim 1, wherein the plating coat layer comprises nickel.

12. The terminal according to claim 1, wherein the plating coat layer comprises molybdenum.

13. The terminal according to claim 1, wherein the plating coat layer comprises zirconium.

14. The terminal according to claim 1, wherein the plating coat layer comprises titanium.

\* \* \* \* \*